March 29, 1955 W. J. DE BEAUBIEN 2,704,962
OPTICAL VIEWING DEVICE
Filed April 22, 1950 2 Sheets-Sheet 1
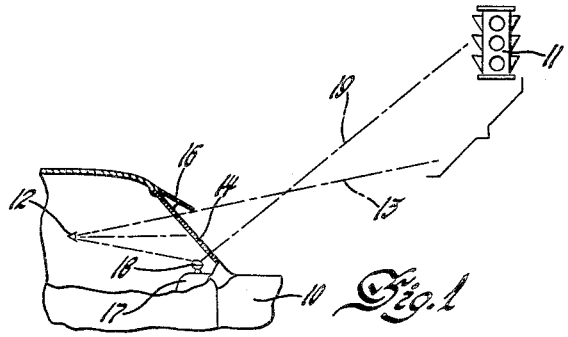
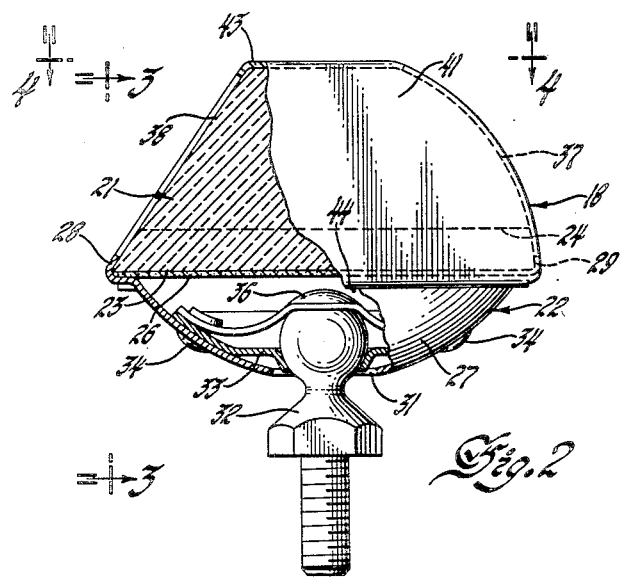
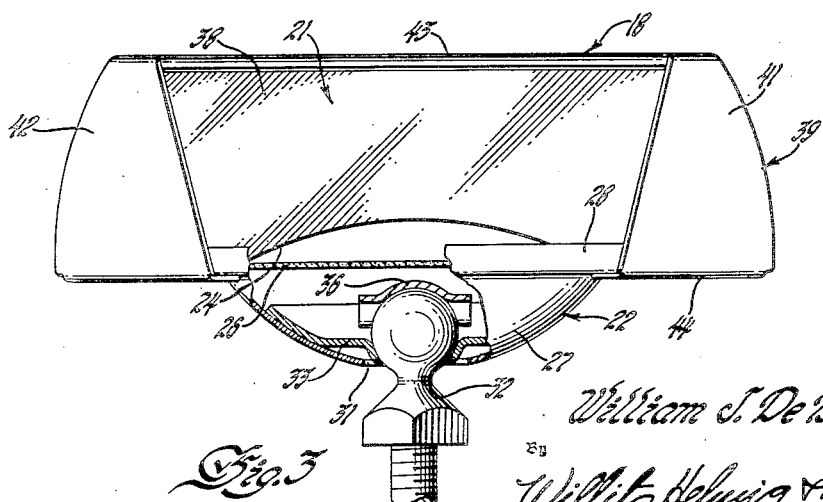
Inventor
William J. De Beaubien
By Willits, Helwig & Baillie
Attorneys

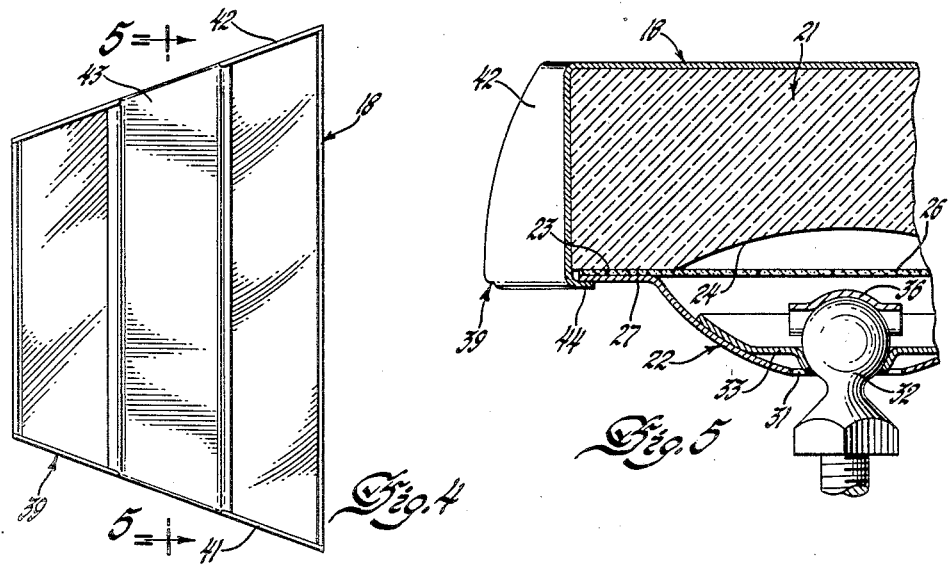
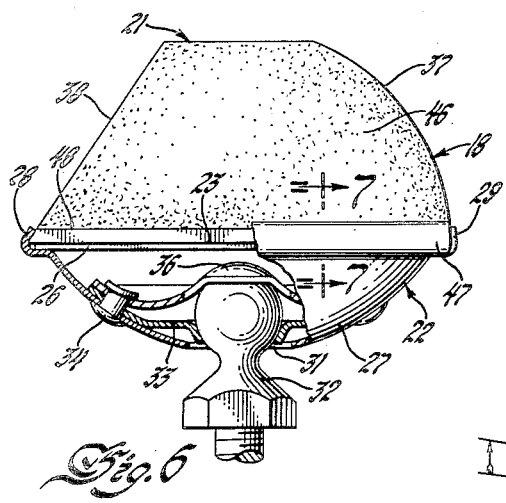
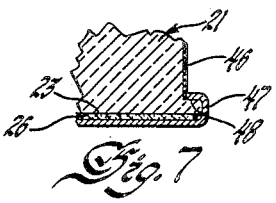
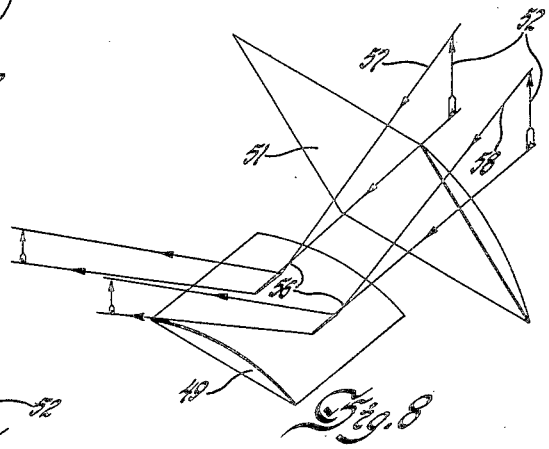
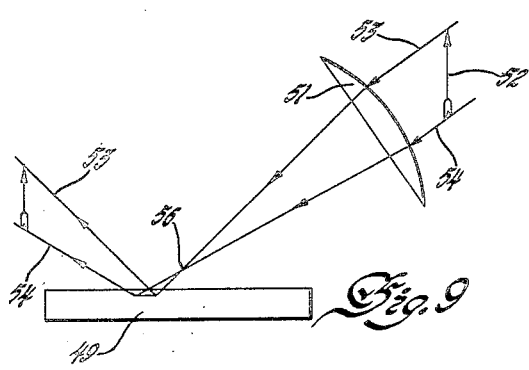

United States Patent Office 2,704,962
Patented Mar. 29, 1955

2,704,962

OPTICAL VIEWING DEVICE

William J. de Beaubien, Birmingham, Mich., assignor to General Motors Corporation, Detroit, Mich., a corporation of Delaware Application April 22, 1950, Serial No. 157,563

7 Claims. (Cl. 88—98)

This invention relates to signal light viewing devices for use in automotive vehicles and has particular relation to devices of such kind adapted to be mounted upon the instrument panel of a motor vehicle and wherein signal lights for controlling traffic operation may be observed by the operator of the vehicle.

It has been customary heretofore to provide various kinds of devices for use on automobiles for viewing traffic signal lights which cannot otherwise be observed by the operators of an automobile. These have been positioned on the instrument panels of automobiles, they have been secured to windshields of automobiles, and they have been secured above and in front of the windshields of automobiles in such manner as to reflect or otherwise project images within viewing devices positioned elsewhere within the range of observation of the operator of an automobile. These devices have had many objectionable features.

One of these objectionable features has been that such devices have had a very limited angular field of observation both horizontally and vertically and they consequently cannot be used in many automobiles of modern design wherein the point of vision of the operator of the automobile is considerably elevated and at some distance from the windows and windshield of the automobile. From such point of vision the operator can see in all directions outwardly and downwardly but has a limited vision upwardly particularly in front of the automobile.

Another objection to these devices has been that many of them did not produce a true image of the signal light being observed. The signal light might be upside down or oppositely handed or reduced or of improper proportions. For example, a traffic signal associated with an arrow pointing to the right might appear in these devices as a signal with an arrow pointing to the left. Another example would be a signal light shown upside down. An upside down signal light might be perfectly all right for a person with normal color vision because such person could see when the light was red or green regardless of the position of the light, but a person who was color blind would not be able to distinguish between the color of lights and if the signal lights were shown upside down such a person would be confused by the fact that the upper part of the light which normally would mean to proceed would in such a reversing device mean exactly the opposite.

An object of the invention is to provide on the instrument panel of an automobile a light reflecting prism which can be employed by the operator of the automobile for observing traffic signals which are above and out of the line of vision of the operator of the automobile when the automobile is stopped.

Another object of the invention is to provide in front of the driver of an automobile a light reflecting surface in which the operator of the automobile can see traffic signals not directly within the operator's line of vision and in which surface such traffic signals will appear in upright positions, proportionally reduced in dimensions, and proper with respect to the right or left-handedness of the object being reflected.

Another object of the invention is to provide an optical viewing device that when properly viewed will reverse an image reflected by one surface thereof, so that the twice reversed image will appear in the same relation to the observer as the object being observed.

Another object of the invention is to provide a lens for reversing the vertical position of an object without reversing the horizontal relation of the parts thereof, and to position such lens with respect to a light reflecting surface in such manner that the lens will vertically reverse the image of an object viewed in such reflecting surface and through said lens, but will not reverse the right and left-handedness of the object.

Another object of the invention is to provide an optical viewer for use in connection with automobiles which will provide within the view of the operator of an automobile, images of objects in front of the automobile, and throughout a much wider vertical field of observation than is now provided in optical viewers for such purposes.

Another object of the invention is to provide a mounting for a light reflecting prism for use in viewing signal lights on automobiles; this mounting being provided with universal attaching means so that the same can be secured in any position on the instrument panel of an automobile, and having formed as a part thereof a shield device for securing the prism to the mounting and for protecting the prism from light projected thereon in other than the directions in which the prism is adapted to receive light from objects to be viewed and from which the prism is observed.

Other and further objects of the invention will be apparent from the following description and from the drawings, in which:

Figure 1 is a fragmentary view of the front part of an automobile approaching a street light or traffic signal device, and having mounted on the instrument panel thereof and within the casual field of vision of the vehicle operator a traffic signal viewing device embracing the principles of the invention.

Figure 2 is a view partially in elevation and partly in section illustrating the optical viewer or traffic signal observing device embraced in the structure illustrated by Figure 1.

Figure 3 is a rear view of the optical viewing device illustrated by the previous figures, as the device might appear from the plane indicated by the arrows 3—3 on Figure 2. Figure 3 has certain parts thereof broken away and illustrated in section so as to show the universal mounting employed in mounting the device upon the instrument panel of an automobile.

Figure 4 is a top view of the traffic signal viewing device illustrated by the preceding figures, as the same might appear from the plane indicated by the arrows 4—4 on Figure 2.

Figure 5 is a vertical sectional view of the traffic signal viewing device illustrated by the preceding figures as the same might appear in the plane of line 5—5 appearing on Figure 4.

Figure 6 is a side elevational and sectional view of a traffic signal viewing device embracing the principles of the invention and being provided with different means for mounting the device and for shielding the same from undesirable light.

Figure 7 is a fragmentary vertical sectional view of a part of the mounting for the traffic signal viewing device illustrated by Figure 6. Figure 7 is taken substantially in the plane of line 7—7 on Figure 6.

Figure 8 is a perspective view of a pair of plano-convex optical elements so positioned with respect to one another as to illustrate the optics of a device embracing the principles of the invention.

Figure 9 is a side elevational view of the optical elements illustrated by Figure 8 and also illustrating a relation of such elements which may be employed in practicing the principles of the invention. Figure 9 also shows an optical diagram of the way in which light is projected and reflected by the two optical elements employed in the illustrations of Figure 8 and Figure 9.

In Figure 1 there is employed in illustrating the invention the front portion of an automobile indicated at 10, the automobile being stopped in front of a street light or traffic signal indicated at 11. The point of vision of the operator of the automobile is indicated at 12 and the line of vision of the operator is indicated as being beneath the dot-and-dash line indicated at 13. The upward vision of the operator of the automobile is limited by the upper part of a windshield 14 having a visor 16 projecting over the upper part thereof as is sometimes the custom in the construction of automobiles.

Disposed on the instrument panel 17 of the automobile and within the casual field of vision of the operator of the automobile is a traffic signal viewing device or optical viewer indicated at 18, the device 18 being so positioned as to be exposed throughout an extensive vertical angle of observation, to light projected by the traffic signal 11, through the windshield 14, and along the dot-and-dash line indicated at 19. In such position it will be apparent that the device 18 may be exposed to light projected from the traffic signal device at a much steeper angle than is indicated by the line 19.

Referring particularly to Figures 2 to 6, it will be apparent that the device 18 comprises a light transmitting or transparent body or prism 21 adapted to be supported by a mounting 22 by which the device is adapted to be secured and supported in any desired position upon the instrument panel 17 of the automobile 10.

The lower face 23 of the body 21 is formed in such manner as to provide an elongated concave surface 24 therein, the surface 24 comprising the curved optical element or reflector having an axis of curvature somewhere below the face 23 of the body 21. While the surface 24 is a concave surface in relation to its formation within the body 21, such surface will present a convex surface for observation through the transparent material forming the body 21. The surface 24 may be a cylindrical, conical, hyperbolic, parabolic or other curved surface having an axis disposed externally of the body 21 and adapted to be disposed in parallel relation to the normal line of vision of the operator of the automobile 10.

The body 21 is adapted to be formed of glass, clear plastic or any other transparent material upon which a smooth light transmitting optical or reflecting surface such as that indicated at 24 may be formed.

The face 23 of the body 21 is adapted to be supported upon a fibrous or other suitable supporting plate indicated at 26, and in Figures 2 to 5 the plate 26 is adapted to be supported throughout the edge portions thereof upon an arcuate mounting part or shell indicated at 27. The edges of the shell 27 are turned upwardly and inwardly at the front and back portions of the body 21 as is indicated at 28 and 29, these upwardly turned parts being for the purpose of clamping the body 21 between the edges of the shell 27 and upon the plate 26. The lower part of the shell 27 is provided with an opening 31 through which a ball head screw 32 is adapted to project. The head of the screw 32 is universally supported in a socket formed in a bracket 33 which is held in position in the lower part of the shell 27 by rivets indicated at 34. The upper part of the head of the screw 32 is held in position within the socket formed in the bracket 33 by an arcuately formed spring 36 which projects across the top of the ball and is secured in such position upon the bracket 33 by the rivets 34. The screw 32 when secured in the top of the instrument panel 17 is adapted to hold the body 21 in such position that the optical surface 24 will extend in parallel relation to and just below the direct line of vision of the operator of the automobile.

The front part of the body 21 is formed in such a way as to provide another optical surface indicated at 37. The surface 37 is arcuate in cross-section and formed about an elongated axis within the body 21 that extends across the body and transversely relative to the linear elements of curvature of the surface 24. The optical element or surface 37 when so formed will be a light converging surface across the front of the body 21, which will cause light rays from any object such as the street light 11 to converge along a focal line or axis of the surface 37, and to be projected therefrom upon the optical element 24.

The face of the body 21 disposed at the opposite end of the optical surface 24 is formed to provide a planular or flat optical surface indicated at 38. The surface 38 is disposed in such position as to be approximately normal to the line of vision of the operator of the automobile when the operator's vision is directed at the device 18. The surface 38 is disposed in such normal relation to the line of vision of the operator that the operator's vision will not be appreciably distorted by the surface 38 when the operator looks through the surface 38 for the purpose of observing the surface 24 within the body 21.

The device 18 may be mounted upon the instrument panel 17 or other suitable part of the automobile 10 in such a way that the operator of the automobile may view the top of the surface 24 of the body 21 at an angle of incidence greater than the critical angle of the glass, plastic, or other material of which the body 21 is formed. Under such circumstances the operator will not be able to see through the surface 24 as might be the case should the operator view the surface 24 at an angle of incidence not greater than the critical angle of the material of which the body 21 is composed. When the operator does view the surface 24 through the flat surface 38 at such an angle of incidence the surface 24 will appear to the operator as an angularly disposed mirror and will reflect within the view of the operator any image that may be projected upon the surface 24 by an object projecting light on the surface 24 within the incident field of vision of the device when so positioned.

The convex or light converging surface 37 is also disposed at an angle with respect to the surface 24 in such manner that light from a traffic signal, such as that indicated at 11, may be projected upon the surface 37 from the time that the street light first appears within the range of vision of the operator of the automobile to the time when the street light is positioned above the device 18 but within the critical angle of the material of which the body 21 is made. Throughout such field of observation light rays from the traffic signal 11 will be projected upon the surface 37 and will be made to converge thereby upon a focal line or axis beyond the surface 37. It will be apparent that the surface 24 is long enough that such light rays can be projected through the surface 37 and upon some part of the surface 24 where the angle of incidence of the rays will be greater than the critical angle of the material of which the body 21 is formed. Under such circumstances, it will be apparent that the light rays from the signal 11 will be reflected by the surface 24 to provide a virtual image of the signal 11 within the view of the operator of the automobile 10.

In order to prevent light from other directions from entering the body 21 there is provided a shield indicated at 39 having parts 41 and 42 covering the opposite ends of the body 21 and a part 43 covering the top face of the body between the upper adjacent surfaces of the optical elements 37 and 38. The shield 39 is adapted to be flanged inwardly along the lower extremities thereof as is indicated at 44 for securing the shield beneath the outer edges of the shell 27.

In the structure disclosed by Figures 6 and 7 the shield 39 may be dispensed with, and in such event the end and top surfaces of the body 21 may be painted, frosted or otherwise rendered incapable of transmitting light. The numeral 46 in Figures 6 and 7 indicates such surfaces. In such structure in order to hold the body 21 in position upon the shell 27 of the mounting 22, the shell 27 is provided with upwardly flanged end parts indicated at 47, these parts being bent around ledges 48 formed at the opposite end portions of the body 21 and adjacent the lower face 23 thereof. The flanges 47 and the end flanges 28 and 29 are in such manner operatively associated with one another in securing the body 27 upon the mounting 22 without requiring a shield such as that indicated at 41 (see Figure 4).

In order to provide an optical viewing device having a greater vertical angle throughout which images may be seen upon the reflecting surface 24, it may be found preferable to coat the surface 24 with quicksilver or other suitable light reflecting material. In such event it will be possible to view images upon the surface 24 throughout greater angles than angles beyond the critical angle of material of which the body 21 is composed. As a matter of fact, by moving forwardly with respect to the device 18, it may be possible to see images of signals that are almost directly above the device 18. Such alternative coating of the surface is also indicated at 24 by the thickness of the line in the figures of the drawing.

In Figure 8 there is illustrated a plano-convex optical element indicated at 49 which is adapted to be disposed in a position comparable to the surface 24 when viewing an object such as the street light 11 illustrated in Figure 1. The element 49 is elongated in formation and has an axis of curvature extending throughout the length thereof and about which any suitable convex surface may be formed. Such suitable surface might be described as cylindrical, conical, hyperbolic, parabolic, etc., and may be coated or not coated with light reflecting material, as desired. The optical element or lens 49 is formed of any suitable light transmitting substance, such as glass, clear plastic, etc.

When an uncoated optical element such as the element 49 is positioned between an observer and the object to be observed with the axis thereof extending between the observer and the object but beneath the line of vision of the observer, so that the observer can view the curved surface of the element 49 at an angle of incidence greater than the critical angle of the material of the element 49, then the curved surface of the element 49 will become a light reflecting surface and the object in question then may be viewed in the light reflecting surface of the element 49. Since the element 49 has a light converging surface when light is transmitted through the element, such surface will act as a diverging surface when light is reflected therefrom, and consequently any object viewed by so observing the surface of the element 49 will appear reduced in width but of the same length as it would appear in a planular or flat mirror. However, the image of the object will appear to be reversed or upside down.

However, if the image of the object is viewed through another optical element, such as that indicated at 51, it will be possible to reverse the image appearing in the element 49 and to make the same appear right side up, of reduced length as well as width, and with the same parts being at the right and left hand side of the image as they are within the object. The element 51 is a plano-convex element or lens which is similar to the element 49 and which may be formed of glass, plastic or other suitable material, and is provided with a focal axis or line extending lengthwise of the element adjacent the plane surface thereof. The lens or element 51 when held at an angle with respect to the element 49 and with the axis thereof extending transversely relative to the axis of the element 49, may be made to converge and to reverse the relation of the light rays falling upon the element 49 so that the image projected upon the element 49 is reversed by the element 51. Hence the image which will appear to the observer will be erect, since it has been reversed twice; once by the light converging element 51 and once by the light reflecting element 49.

This will be apparent from observing Figure 9 where two parallel rays of light from an object 52 are indicated at 53 and 54. The rays 53 and 54 are bent by the lens or element 51 in such manner as to cross one another at a focal axis indicated at 56, and hence are projected upon the light reflecting element 49 in a reverse relation to that in which they are projected from the object 52. However, when the light reflecting element 49 is viewed by an observer looking downwardly at the element 51, the image apparent to the observer appears to be right side up because the observer sees the ray 54 from the bottom of the image as being nearer than the ray 53 from the top thereof.

As will be apparent from Figure 8 parallel pairs of lines 57 and 58 drawn from both the top and bottom of both the right and left hand sides of an object such as that indicated at 52, will cross at the focal line indicated at 56 and in a horizontal plane tangent to the thickest part of the element 49. However, since the element 51 is formed about an axis parallel thereto, it converges light only in one direction with respect to such axis and hence the lines 57 and 58 remain parallel with respect to a vertical plane through the element 49. Since the lines 57 and 58 cross only in one direction, this being on a horizontal line coincident with the focal axis 56, they do not reverse the image vertically. Hence the right hand side of the object indicated by the lines 58 will be on the right hand side of the image viewed by the observer, and the image will have the same handedness as the object observed. However, the element 51 will shorten the height of the image projected upon the element 49, and since the element 49 narrows the width of the image, the image observed by the observer will appear reduced in both horizontal and vertical dimensions, and hence will appear of normal proportions.

The optical characteristics of the body 21 will be the same as are illustrated by Figures 8 and 9, the optical element 37 of the body 21 performing the same function as the optical element 51, and the optical element 24 performing the same functions as the optical element 49.

The device 18, therefore, will reflect within the view of the operator of the automobile 10 an image of the street light 11 which will appear upon the surface 24 of the body 21 as an erect, reduced, virtual and proper handed image of the signal light 11.

I claim:

1. An optical viewer comprising a transparent body having a lower wall, a front wall, and a rear wall, said lower wall being formed to provide a curved cylindrical surface extending from the front to the rear end thereof and being formed about an axis extending below said lower wall, said front wall being formed to provide a cylindrical surface extending transversely of said body and about an axis disposed normally with respect to said axis of said surface of said lower wall, said surface of said front wall being curved to provide a focal axis between said front wall and said surface of said bottom wall so that parallel light rays from above and incident upon said front wall will intersect between said front wall and said surface of said bottom wall, said front wall being disposed at an acute angle with respect to said bottom wall, said rear wall being disposed with respect to said bottom wall to project said light rays upon the observer after said light rays have been reflected by said curved cylindrical surface of said bottom wall.

2. An optical viewer comprising a transparent body having a lower wall, a front wall, and a rear wall, said lower wall being formed to provide a curved cylindrical surface extending from the front to the rear end thereof and being formed about an axis extending below said lower wall, said front wall being formed to provide a cylindrical surface extending transversely of said body and about an axis disposed normally with respect to said axis of said surface of said lower wall, such front wall being curved to provide a focal axis between said front wall and said surface of said bottom wall so that parallel light rays from above and incident upon said front wall will intersect between said front wall and said surface of said bottom wall, said front wall being disposed at such an acute angle with respect to said bottom wall that said parallel light rays when admitted by said front wall will be incident upon said surface of said bottom wall at angles greater than the critical angle of the material of said transparent body, said rear wall being disposed with respect to said bottom wall to project said light rays upon the observer after said light rays have been reflected by said curved cylindrical surface of said bottom wall.

3. An optical viewer comprising a transparent body having a lower wall, a front wall, and a rear wall, said lower wall being formed to provide a curved cylindrical surface extending from the front to the rear end thereof and being formed about an axis extending below said lower wall, said front wall being formed to provide a cylindrical surface extending transversely of said body and about an axis disposed normally with respect to said axis of said surface of said lower wall, said surface of said front wall being curved to provide a focal axis between said front wall and said surface of said bottom wall, so that parallel light rays from above and incident upon said front wall will intersect between said front wall and said surface of said bottom wall, said front wall being disposed at an acute angle with respect to said bottom wall, said body being formed and constructed to provide light reflecting means at said surface of said bottom wall for reflecting said light rays from said curved cylindrical surface of said bottom wall through said rear wall, said rear wall being disposed with respect to said bottom wall to project said light rays upon the observer after said light rays have been reflected by said curved cylindrical surface of said bottom wall.

4. An optical viewer as defined by claim 1 and in which the radii of curvature of said surface of said bottom wall are less than the radii of curvature of said surface of said front wall.

5. An optical viewer as defined by claim 1 and in which the width of said surface of said bottom wall is less than the width of said front wall.

6. An optical viewer as defined by claim 1 and in which said surface of said bottom wall is narrower than the width of said front wall and in which said body is formed to provide obliquely disposed side walls extending from the rear end of said surface of said bottom wall to the ends of said surface of said front wall.

7. An optical viewer as defined by claim 1 and in which said front and rear walls of said body form acute angles with respect to said bottom wall whereby an observer looking forwardly and downwardly into said rear wall can see the reflection on said surface of said bottom wall of an object in front of and above said front wall.

References Cited in the file of this patent

UNITED STATES PATENTS

| | | |
|---|---|---|
| 427,688 | Hooper | May 13, 1890 |
| 1,683,951 | Buttron | Sept. 10, 1928 |
| 1,750,947 | Vons | Mar. 18, 1930 |
| 1,785,347 | Herrschaft | Dec. 16, 1930 |
| 1,826,090 | Phelps | Oct. 6, 1931 |

FOREIGN PATENTS

| | | |
|---|---|---|
| 3,954 | Great Britain | of 1911 |